(12) United States Patent
Matsune et al.

(10) Patent No.: US 9,069,949 B2
(45) Date of Patent: Jun. 30, 2015

(54) NON-TRANSITORY COMPUTER READABLE STORAGE MEDIUM, ACCESS FILTERING DEVICE, AND ACCESS FILTERING METHOD

(75) Inventors: Shinji Matsune, Hirosima (JP); Kanako Ogasawara, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 13/067,947

(22) Filed: Jul. 8, 2011

(65) Prior Publication Data

US 2012/0079599 A1 Mar. 29, 2012

(30) Foreign Application Priority Data

Sep. 29, 2010 (JP) .................................. 2010-219718

(51) Int. Cl.
G06F 17/30 (2006.01)
G06F 21/51 (2013.01)
(52) U.S. Cl.
CPC ........ *G06F 21/51* (2013.01); *G06F 2221/2101* (2013.01); *G06F 2221/2119* (2013.01)
(58) Field of Classification Search
CPC ............ G06F 21/51; G06F 2221/2101; G06F 2221/2119
USPC .......................................................... 726/26
See application file for complete search history.

(56) References Cited

U.S. PATENT DOCUMENTS 8,725,751 B1 * 5/2014 Lai et al. ........................ 707/757
2003/0009495 A1 * 1/2003 Adjaoute ................... 707/501.1
2004/0122947 A1 * 6/2004 Banerjee et al. ............... 709/225
2004/0210532 A1 * 10/2004 Nagawa et al. .................. 705/51
2005/0102184 A1 5/2005 Koyata
2006/0224636 A1 * 10/2006 Kathuria et al. ............... 707/200
2006/0248442 A1 * 11/2006 Rosenstein et al. ......... 715/501.1
2007/0011303 A1 * 1/2007 Hatakeyama et al. ......... 709/224
2008/0068454 A1 * 3/2008 Hirakawa ........................ 348/65
2009/0138811 A1 * 5/2009 Horiuchi et al. ............... 715/768

FOREIGN PATENT DOCUMENTS

| JP | 11-205380 | 7/1999 |
|---|---|---|
| JP | 2004-334851 | 11/2004 |
| JP | 2005-71522 | 3/2005 |
| JP | 2007-172221 | 7/2007 |
| JP | 2008-287447 | 11/2008 |

(Continued)

OTHER PUBLICATIONS

Japanese Office Action mailed Apr. 8, 2014 in corresponding Japanese Application No. 2010-219718.

(Continued)

*Primary Examiner* — Baotran N To
(74) *Attorney, Agent, or Firm* — Staas & Halsey LLP

(57) ABSTRACT

An access filtering device includes a receiving unit that receives a URL of a prohibited site or a prohibited page; an executing unit that accesses the page by using the URL; an acquiring unit that acquires page information corresponding to the URL; a prohibited site list that includes character strings of prohibited sites and prohibited pages; a determining unit that determines whether the URL is a character string of a prohibited site or a prohibited page; a display control unit that, when the URL is a character string of a prohibited site or a prohibited page, displays the page in a decreased page-readability state, i.e., in a transparent state.

17 Claims, 9 Drawing Sheets

(56) References Cited

FOREIGN PATENT DOCUMENTS

| JP | 2009-15582 | 1/2009 |
| JP | 2009-124453 | 6/2009 |
| JP | 2010-61228 | 3/2010 |

OTHER PUBLICATIONS

New Akiba Co., Ltd., "Countermeasures Against Hacking and Browser Crashers are Needed, too!", Feature Article 2, vol. 10, Oct. 1, 2008, pp. 144-147.

* cited by examiner

FIG.3

| 15A | 15B | 15C | 15D | 15E | 15F | 15G | 15H | 15I |
|---|---|---|---|---|---|---|---|---|
| PC NAME | ACCESS DATE-AND-TIME | USER NAME | DOMAIN NAME | LOG TYPE | REASON FOR COLLECTION | ATTACH-MENT | DETAILS | REMARKS |
| PC01 | 20:30:40/ 24/8/2010 | Ando | S-DOM | URL ACCESS PROHIBITION | VIOLATING | | [APPLICATION A] ACCESSES THE WEB SITE [AAA.co.jp] | http:// www.AAA.co.jp/ game/free/... |
| PC01 | 20:30:40/ 24/8/2010 | Ando | S-DOM | WINDOW TITLE ACQUISITION | PERMITTED | 1 | A WINDOW IS DETECTED IN [FREE GAME SITE]. APPLICATION NAME: APPLICATION A | |

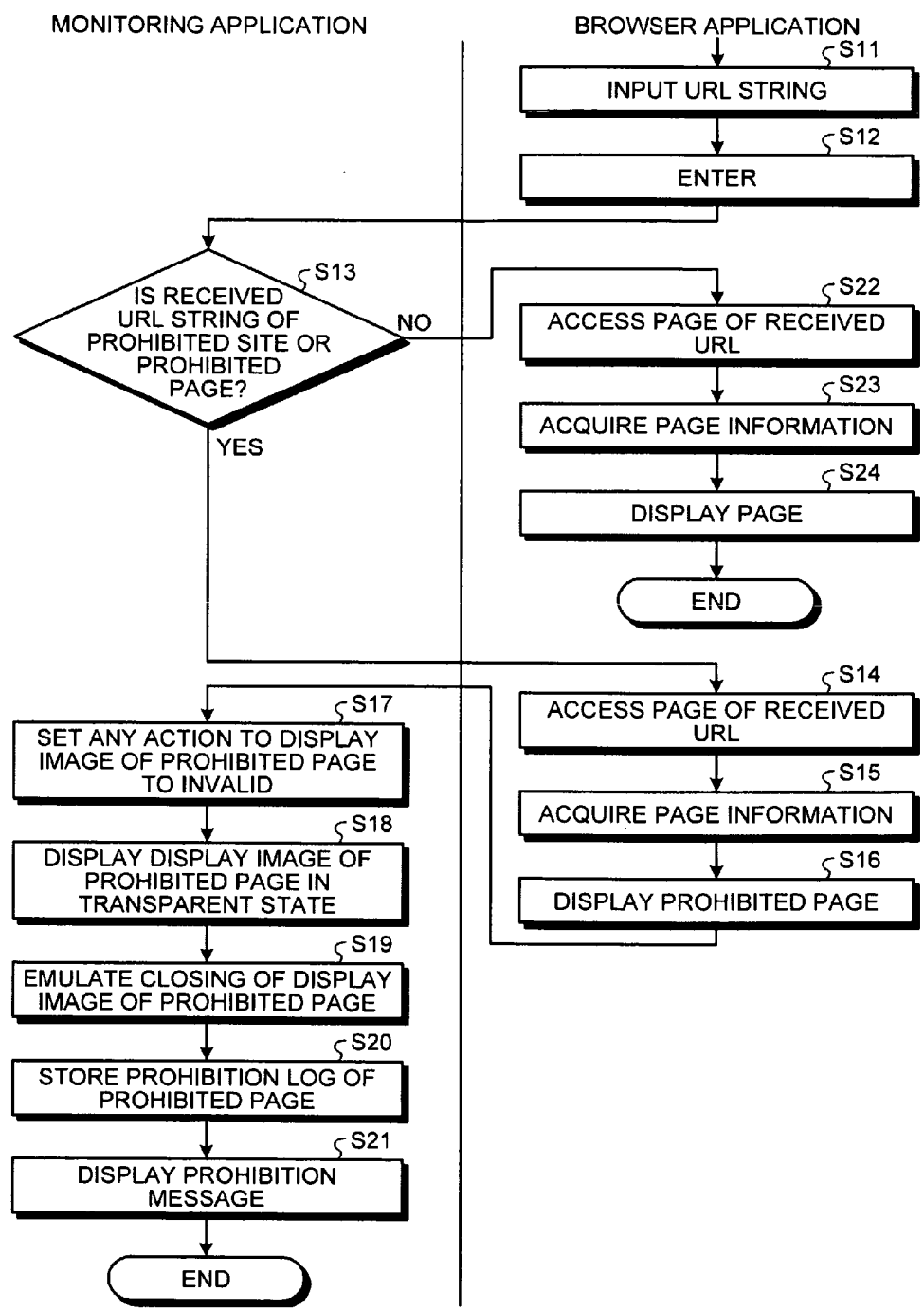

FIG.5
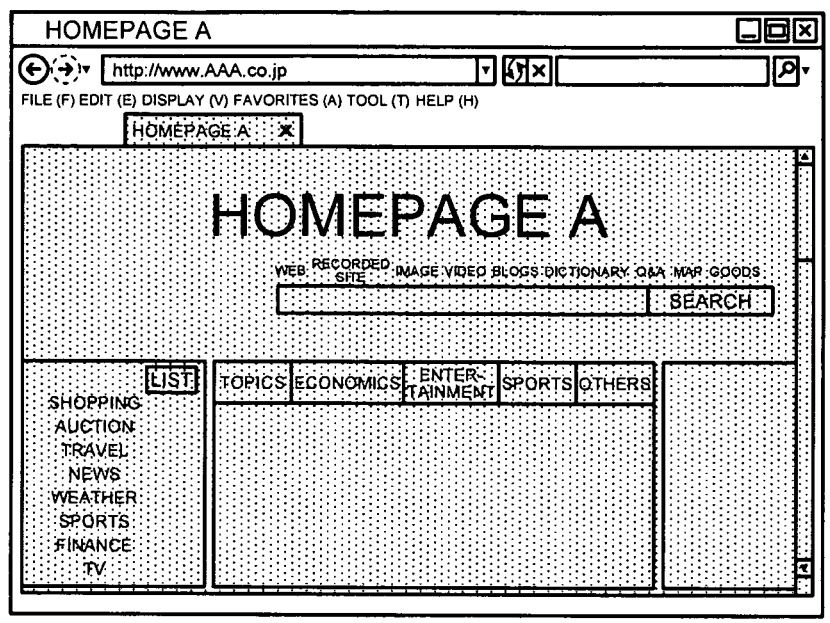
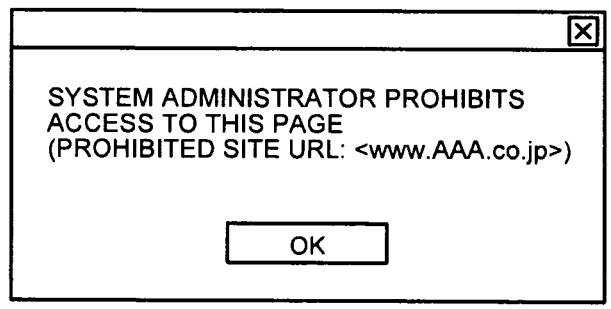

NON-TRANSITORY COMPUTER READABLE STORAGE MEDIUM, ACCESS FILTERING DEVICE, AND ACCESS FILTERING METHOD

CROSS-REFERENCE TO RELATED APPLICATION

This application is based upon and claims the benefit of priority of the prior Japanese Patent Application No. 2010-219718, filed on Sep. 29, 2010, the entire contents of which are incorporated herein by reference.

FIELD

The embodiments discussed herein are directed to a non-transitory computer readable storage medium, an access filtering device, and an access filtering method.

BACKGROUND

When, for example, a user accesses a Web page that is posted on a network (hereinafter, "page") by using his/her terminal, the user inputs a uniform resource locator (URL) indicative of the address of the desired page. When, for example, the user hopes to access a particular Web site (hereinafter, "site"), the user inputs a URL that corresponds to the top page of the particular site. The terminal is then navigated to the desired page in accordance with the received URL. From the perspective of smooth job operations, some administrators who manage terminals in an office prevent users in the office from accessing inappropriate sites and inappropriate pages of a site.

A well-known technology enables an administrator to label some sites as prohibited sites and prohibit any access to these prohibited sites, thereby preventing users from reading inappropriate sites (see, for example, Japanese Laid-open Patent Publication No. 11-205380). The terminal has the URLs of the prohibited sites. When the terminal receives, from a user, a URL that is identical to a URL of a prohibited site, access to the site that corresponds to the received URL is prohibited. The terminal thus prevents the user from reading the site.

As described above, when a received URL is identical to the URL of a prohibited site, access to the site that corresponds to the received URL is prohibited to prevent the user from reading the site. This means that the user does not know the reason for difficulty in reading contents of the site or the page that corresponds to the input URL.

The user does not know the reason is, for example, the site or the page that corresponds to the input URL is the URL of a prohibited site or a prohibited page or that the user inputs an incorrect URL that accidentally identical to a URL of a prohibited site or a prohibited page.

Because the user does not know the reason for difficulty in reading contents of the site or the page that corresponds to the input URL, the user may repeatedly try to access the prohibited site or a limited access site.

SUMMARY

According to an aspect of an embodiment of the invention, a non-transitory computer readable storage medium having stored therein an access filtering program causing a computer to execute a process comprising: receiving address information indicative of an address of a page posted on a network; accessing the page by using the address information; acquiring page information corresponding to the address information, the page information including both first information concerned with content of the page and second information concerned with a configuration of a display image of the first information; determining whether any access filtering information corresponding to the address information is present in a storage unit to store access filtering information indicative of an address of a limited access page; and displaying, when it is determined that any access filtering information corresponding to the address information is present, a display image of the page in a decreased readability state by using the first information and the second information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram of an example of a log information table;

FIG. 4 is a flowchart of a prohibited-page filtering process according to the first embodiment;

FIG. 5 is a schematic diagram of an example of display images (single-tab) sequentially appearing on the client terminal during the prohibited-page filtering process according to the first embodiment;

DESCRIPTION OF EMBODIMENTS

Preferred embodiments of the present invention will be explained with reference to accompanying drawings.

The disclosed technology is not limited to the following embodiments.

[a] First Embodiment

Figure 1:
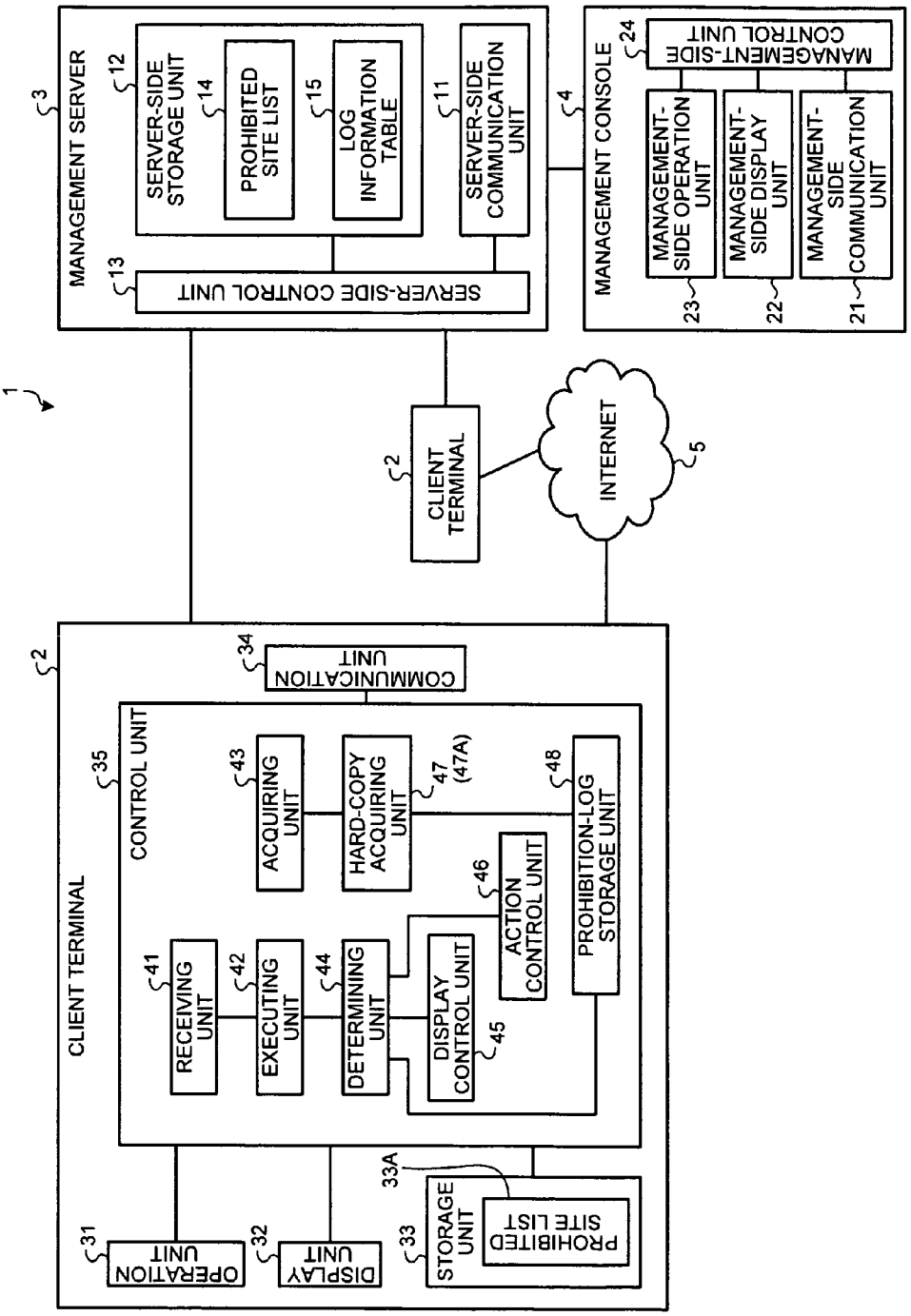
FIG. 1 is a block diagram of the configuration of a prohibited-page filtering system according to the first embodiment.

FIG. 1 is a block diagram of the configuration of a prohibited-page filtering system according to the first embodiment. As illustrated in FIG. 1, a prohibited-page filtering system 1 includes, for example, a plurality of client terminals 2, a management server 3 that manages the client terminals 2, and a management console 4 that performs various settings of the management server 3. The management server 3 records actions of the client terminal 2 that may cause a leak of information to prevent both problematic behavior and leakage of electric information.

The management server 3 has, for example, a logon control/recording function, a policy management function, an action control/recording function, an original-file saving function, and a service activation control function. The logon control/recording function enables prohibiting a logon of any client terminal 2 having an account authority that violates the policy and enables recording logon and logoff of the client terminal 2. The policy management function enables setting a given action to a prohibited action and a given log to a log to be collected, each assigned to a corresponding client terminal 2 or a group of client terminals 2.

The action control/recording function has an application activation prohibiting function, a file action control/recording function, a print-screen key invalidation function, and a sending mail control/recording function. The application activation prohibiting function enables acquiring and managing information about applications installed on the client terminal 2 and prohibiting a selected application from activating. The application activation prohibiting function further enables collecting acquiring, when an action for activating a selected application is detected, the action log. The file action control/recording function enables prohibiting the client terminal 2 from moving, copying, printing, etc., a file by using an external medium and enables setting the above prohibited actions to acceptable temporarily. The file action control/recording function further enables recording file actions that include, for example, reference, creation, update, deletion, copy, move, and rename as logs.

The print-screen key invalidation function enables prohibiting an action of a print-screen key for acquiring a hard copy of the display image of the client terminal 2 and enables recording the key action. The sending mail control/recording function enables stopping, according to the policy set by the administrator, the client terminal 2 from sending a mail with a file attached and enables recording the mail.

The original-file saving function enables, when a file is permitted to move from the client terminal 2 to an external recording medium, encoding the file forcibly. The original-file saving function further enables recording a log of the move and saving the original of the file in the management server 3. The service activation control function enables acquiring a list of services activatable by the client terminal 2 and prohibiting, by a remote operation, an elective service from activating.

The management server 3 further has an updated device configuration recording function, a screen capture function, a file tracing function, a mail notification function, etc. The updated device configuration recording function enables, when a user connects an external recording medium, such as a USB memory device, to the client terminal 2, determining that the device configuration is updated and then recording the log. The screen capture function enables taking a snap shot (hard copy) of a display image when the title name of the display image (window) of the client terminal 2 includes a particular application name and a particular keyword.

The file tracing function enables searching for an action history of the file, such as reference, creation, update, deletion, copy, move, and rename by tracing logs of file actions in the backward direction or the forward direction. The file backward-tracing function enables searching for an action history of the file by tracing the logs backward in chronological order. The file forward-tracing function enables searching for an action history of the file by tracing the logs forward in chronological order. The mail notification function enables, when the client terminal 2 detects a particular action, for example, a violating action, sending a mail to the management console 4 of the administrator to notify that the particular operation occurs.

Figure 2:
FIG. 2 is a schematic diagram of an example of a prohibited site list.

As illustrated in FIG. 1, the management server 3 includes a server-side communication unit 11, a server-side storage unit 12, and a server-side control unit 13. The server-side communication unit 11 is connected to the client terminals 2 and the management console 4. The server-side storage unit 12 stores therein various types of information and has a prohibited site list 14 and a log information table 15. FIG. 2 is a schematic diagram of an example of the prohibited site list 14. The prohibited site list 14 illustrated in FIG. 2 stores therein a partial URL string or an entire URL string of a prohibited site and a prohibited page. In the example of FIG. 2, the prohibited site list 14 stores therein an entire URL string "AAA.co.jp" and a partial URL string "CCC" of prohibited sites. The contents of the prohibited site list 14 can be registered by, for example, the management console 4 if required. When every page of the site is inaccessible, the domain name is stored. In contrast, when a particular page of a site is inaccessible, the address of the page is stored.

FIG. 3 is a schematic diagram of an example of the log information table 15. The log information table 15 illustrated in FIG. 3 stores therein various logs of an action history, etc. The log information table 15 stores therein PC name 15A, access date-and-time 15B, user name 15C, domain name 15D, log type 15E, reason for collection 15F, attachment 15G, details 15H, and remarks 15I. The PC name 15A is, for example, the machine name of the client terminal 2. The access date-and-time 15B is, for example, a date and time when the client terminal 2 accesses a prohibited site or a prohibited page. The user name 15C is, for example, a logon user name of a user who executes the action. The domain name 15D is, for example, the name of the domain of the client terminal 2 that executes the action.

The log type 15E is, for example, URL access prohibition or window title acquisition. The reason for collection 15F indicates, for example, whether the log is collected due to a violating behavior or a permitted behavior. The attachment 15G indicates, for example, whether a hard copy of the display image is attached and, if attached, the number of attached hard copies.

The details 15H indicates, for example, the reason for collecting a hard copy of the display image, etc. More particularly, when the log is a URL access prohibition log, the details can include an application name of a browser and a prohibited site name and can be a detail of collection "[Application A] accesses the Web site [AAA.co.jp]". When the log is a window title acquisition log, the details can include a window title and an application name of the window and can be a detail of collection "a window is detected in [free game site]. Application name: application A". The remarks 15I are, for example, a URL string of the displayed site or the like when the window (display image) is a browser.

An URL access prohibition log illustrated in FIG. 3 has the following log information: the PC name "PC01", the access date-and-time "20:30:40 24/8/2010", the user name "Ando", the domain name "S-DOM", the log type "URL access prohibition", and the reason for collection "violating behavior". The URL access prohibition log further has the details "[Application A] accesses the Web site [AAA.co.jp]".

The management console 4 illustrated in FIG. 1 is, for example, a personal computer or the like. The management console 4 includes a management-side communication unit 21, a management-side display unit 22, a management-side operation unit 23, and a management-side control unit 24. The management-side communication unit 21 is connected to the management server 3. The management-side display unit 22 displays various types of information on a screen. The management-side display unit 22 corresponds to, for example, a monitor unit. The management-side operation unit 23 is, for example, a mouse, a keyboard, etc., that is used to input various types of information. The management-side control unit 24 controls the management console 4.

The client terminal 2 is, for example, a personal computer, etc. The client terminal 2 includes an operation unit 31, a display unit 32, a storage unit 33, a communication unit 34, and a control unit 35. The operation unit 31 is used to input various types of information. The operation unit 31 is, for example, a mouse, a keyboard, etc., that is used to input various types of information. The display unit 32 corresponds to, for example, a monitor unit that displays various types of information on a screen. The storage unit 33 stores therein various types of information. The communication unit 34 is connected to both the management server 3 that is on a network and an Internet 5. The client terminal 2 acquires, from the management server 3, string of prohibited sites and prohibited pages included in the prohibited site list 14 and stores the acquired strings of the prohibited sites and the prohibited pages in a prohibited site list 33A of the storage unit 33. The storage unit 33 corresponds to a "memory" in the access filtering device.

The control unit 35 includes a receiving unit 41, an executing unit 42, an acquiring unit 43, a determining unit 44, a display control unit 45, an action control unit 46, a hard-copy acquiring unit 47, and a prohibition-log storage unit 48. The above units 41 to 48 of the control unit 35 operate according to applications: the receiving unit 41, the executing unit 42, and the acquiring unit 43 operate according to, for example, a browser application. The determining unit 44, the display control unit 45, the action control unit 46, and the prohibition-log storage unit 48 operate according to a monitoring application. The hard-copy acquiring unit 47 operates according to a capture application having the screen capture function. The control unit 35 corresponds to a "processor" in the access filtering device.

For example, the receiving unit 41 receives a URL string of a target site from the operation unit 31 of the client terminal 2. The executing unit 42 accesses a site that corresponds to the received URL on the Internet 5 via the communication unit 34. The acquiring unit 43 acquires page information that is needed to display a page of the site that corresponds to the received URL currently being accessed. The determining unit 44 determines whether the received URL is a character string of a prohibited site or a prohibited page included in the prohibited site list 33A.

When the received URL currently being accessed is a character string of a prohibited site or a prohibited page included in the prohibited site list 33A, the display control unit 45 displays a display image of the in-site page by using the page information acquired by the acquiring unit 43. After the display image of the in-site page that corresponds to the received URL is displayed, the display control unit 45 adjusts the display image to decrease the readability of the display image of the page. When the transmittance rate of the display image increases, the display image becomes semi-transparent and, because the background screen becomes visible, the readability of the display image is decreased. The transmittance rate is increased to, for example, about 80%. The display control unit 45 can be configured to first display the display image with a decreased readability and then display the display image in a more decreased readability.

When the received URL currently been accessed is a character string of a prohibited site or a prohibited page included in the prohibited site list 33A, the action control unit 46 sets any operation tab to the display image that relates to the page information assigned to the received URL to invalid. The operation-tab invalid state indicates that any action of the cursor and the keyboard on a prohibited page is locked. In the same time, any click on a linked destination is unacceptable. Any file move actions, such as file download and file upload are also unacceptable. Moreover, the action control unit 46 emulates closing of the display image that relates to the page information assigned to the received URL. The time that is taken to close the display image can be set appropriately by the system administrator or the management console 4 under control of the system administrator. The time that is taken to close the display image is, for example, "two seconds". In other words, the time that is taken to close the display image is preferably set to a time sufficiently long for the user of the client terminal 2 to see the page of the low-readability display image but too short to read the detailed contents of the page. Moreover, the prohibition-log storage unit 48 records a prohibition log of the page information assigned to the received URL, at the same time, and sends the log information assigned to the prohibition log to the management server 3.

After the display control unit 45 emulates closing of the display image that relates to the page information assigned to the received URL, the display control unit 45 displays a prohibition message indicating that the display image is closed because of an access to a prohibited page.

Operation of the prohibited-page filtering system 1 is described according to the first embodiment. FIG. 4 is a flowchart of a prohibited-page filtering process according to the first embodiment. The browser application receives a URL string of a desired site by using the operation unit 31 (Operation S11), and detects that the input URL string is entered (Operation S12). The monitoring application determines, by using the determining unit 44, whether the received URL is a character string of a prohibited site or a prohibited page included in the prohibited site list 33A (Operation S13).

When the received URL is a character string of a prohibited site or a prohibited page included in the prohibited site list 33A, (Yes at Operation S13), the browser application accesses the page or the site of the received URL by using the executing unit 42 (Operation S14). When executing an access to the page of the received URL, the browser application acquires page information (Operation S15). The browser application then displays, on the display unit 32, a display image of the page that relates to the page information (Operation S16). When the target page is a prohibited page, to prevent users from reading a prohibited site or a prohibited page, the display image appears, for example, only for a short time.

After the display image of the prohibited page is displayed, the monitoring application immediately sets, by using the action control unit 46, any operation tab to the display image of the prohibited page to invalid (Operation S17). As a result, any action on the display image of the prohibited page becomes unacceptable. The operation tab invalid state indicates that any action of the cursor and the keyboard on a prohibited page is locked. In the same time, any click on a linked destination is unacceptable. Any file move actions, such as file download and file upload are also unacceptable. The administrator thus controls actions by a user to a prohibited page.

Moreover, the monitoring application displays, by using the display control unit 45, the display image of the prohibited page in a transparent state (Operation S18). The transmittance rate is 0% at Operation S16. The display control unit 45 increases the transmittance rate to 80%, thereby changing the display image of the prohibited page to a transparent state so that the display image becomes semi-transparent. Because the background screen becomes visible due to the increase in the transmittance rate, it becomes difficult to read the contents of the display image of the prohibited page and the user knows that he/she accesses a prohibited page.

The monitoring application displays the display image of the prohibited page being in a transparent state for, for example, about three seconds, then emulates closing of the display image (Operation S19), and then closes the display image of the prohibited page. When the display image of the received URL has a single tab, the browser application is quit and the display image is then closed.

The monitoring application stores a prohibition log of the prohibited page in the prohibition-log storage unit 48 (Operation S20). The prohibition-log storage unit 48 stores therein log information assigned to a URL access prohibition log of the prohibited page. In the same manner as the log information assigned to the URL access prohibition log illustrated in FIG. 3 contains, the log information contains the PC name, the access date-and-time, the user name, the domain name, the log type, the reason for collection, the URL, etc. The monitoring application sends the log information stored in the prohibition-log storage unit 48 to the management server 3.

The monitoring application displays a prohibition message indicating that the display image is closed because of an access to a prohibited page (Operation S21), and the process illustrated in FIG. 4 goes to end. The user reads the prohibition message appearing on the display image and knows the reason for the forced closing of the display image of the prohibited page. The prohibition message is, for example, as illustrated in FIG. 5, "the system administrator prohibits an access to this page (prohibited site URL: <www.AAA-.co.jp>)".

When the received URL is not a character string of a prohibited site or a prohibited page included in the prohibited site list 33A (No at Operation S13), the browser application accesses the page or the site of the received URL by using the executing unit 42 (Operation S22). When the page of the received URL is accessed, the browser application acquires page information (Operation S23). The browser application then displays, on the display unit 32, the display image that relates to the page information (Operation S24), and the process illustrated in FIG. 4 goes to end.

During the prohibited-page filtering process illustrated in FIG. 4, when the received URL corresponds to a prohibited site or a prohibited page, the display image of the prohibited page is displayed in a transparent state. As a result, the user sees the display image being in a transparent state and knows that he/she accesses a prohibited page.

During the prohibited-page filtering process, when the received URL corresponds to a prohibited page, any action on the display image of the prohibited page becomes invalid. The administrator thus controls actions by users to display images of prohibited pages.

During the prohibited-page filtering process, when the received URL corresponds to a prohibited page, a prohibition log due to the access to the prohibited page is recorded and the prohibition log is sent to the management server 3. The administrator thus automatically acquires prohibition logs due to accesses by users to prohibited pages.

During the prohibited-page filtering process, when the received URL corresponds to a prohibited page, the display image of the prohibited page is displayed in a transparent state, then the display image is closed, and then a prohibition message is displayed. As a result, the user reads the prohibition message and knows that the display image is closed forcibly because of access to a prohibited page.

During the prohibited-page filtering process, the display image of the prohibited page is displayed for a short time at Operation S16 and then any action on the display image immediately becomes invalid at Operation S17. However, the process control can skip Operation S17 and go to Operation S18, i.e., it is allowable to display, before actions become invalid, the display image in a transparent state.

It is allowable, during the prohibited-page filtering process, to display the display image of the prohibited page in a transparent state and then set any action on the display image to invalid.

Although, the prohibited-page filtering process involves recording, at Operation S20, the prohibition log of the prohibited page and then displaying, at Operation S21, the prohibition message, it is allowable to display the prohibition message and then record the prohibition log of the prohibited page. It is also allowable to access the page of the received URL and then determine whether the received URL is a character string of a prohibited site or a prohibited page.

Although, during the prohibited-page filtering process, when the display image of the prohibited page is displayed in a transparent state, the transmittance rate is switched from 0% to 80%, the percentages can be any value. It is allowable, during the prohibited-page filtering process, to gradually or stepwisely increase the transmittance rate from 0% to 100%.

Figure 6:
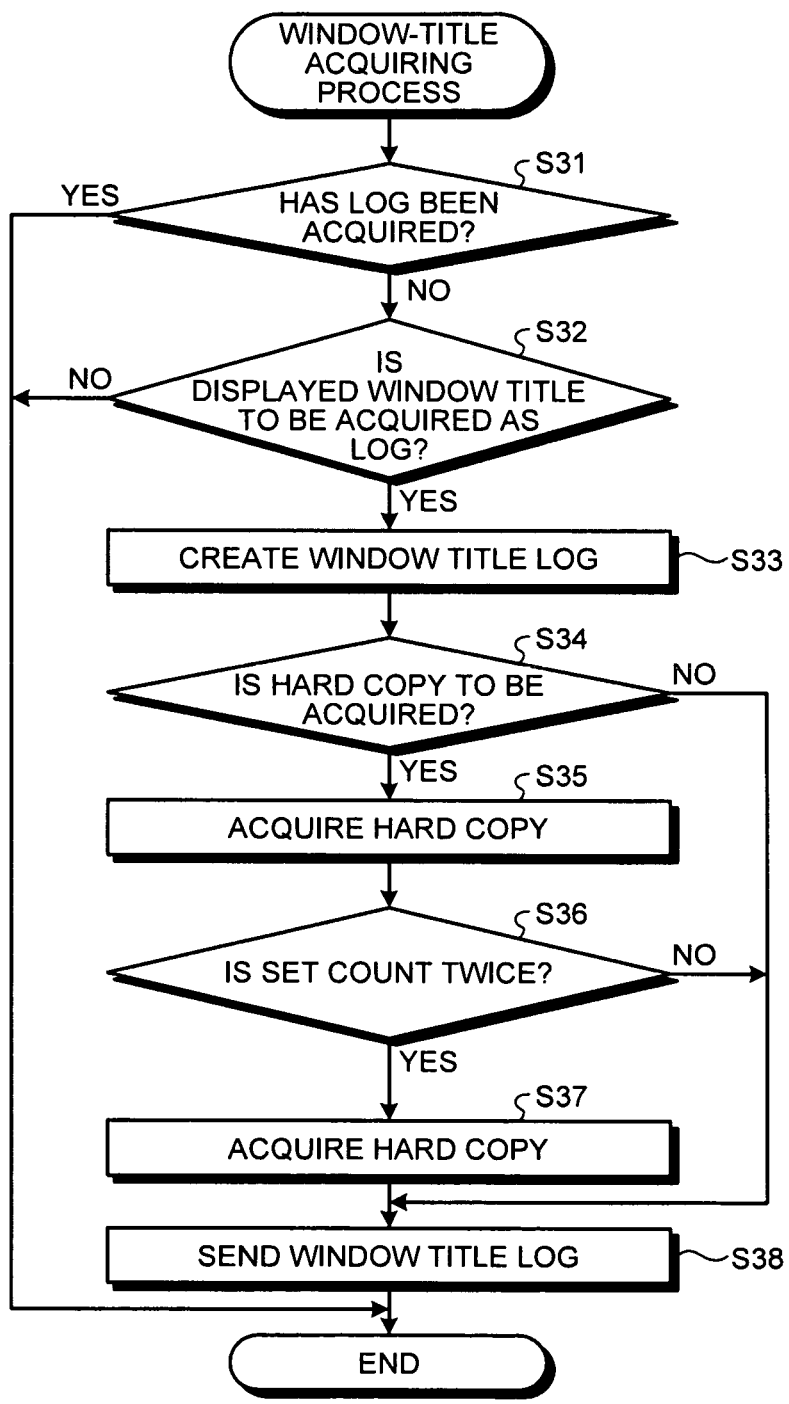
FIG. 6 is a flowchart of a window-title acquiring process.

Described below is operation of the client terminal 2 during a window-title acquiring process. FIG. 6 is a flowchart of operation of the control unit 35 during the window-title acquiring process. The window-title acquiring process is performed by using the capture application having the screen capture function. When a window on the screen is switched to active, the capture application determines whether a log of the window has been acquired (Operation S31). When a log of the window has not been acquired (No at Operation S31), the capture application determines, in accordance with the current log acquiring mode, whether the title of the active window is to be acquired as a log (Operation S32). There are three log acquiring modes: a first mode in which, when the window title includes a particular keyword, a log is acquired; a second mode in which, when the window title includes a particular keyword, a log is not acquired; and a third mode in which a log is acquired in any situation regardless of whether a particular keyword is included.

When the title of the active window is to be acquired as a log (Yes at Operation S32), the capture application creates a log of the window title (Operation S33). The capture application determines, by using the hard-copy acquiring unit 47, whether a hard copy of the active window is to be acquired (Operation S34).

When a hard copy of the active window is to be acquired (Yes at Operation S34), the capture application acquires one hard copy of the active window (Operation S35), and determines whether set count to acquire the hard copy is twice (Operation S36).

When the set count is twice (Yes at Operation S36), the capture application acquires, by using the hard-copy acquiring unit 47, one hard copy of the active window (Operation S37). When the set count is twice, the capture application acquires one hard copy, for example, 500 milliseconds after acquisition of the previous hard copy. The interval is set by taking the possibility into consideration that the capture application fails to acquire a hard copy of the display image of the prohibited page. In the present embodiment, the monitoring application and the capture application operate independently. Therefore, when the capture application acquires the hard copy at Operation S35, there is the possibility that the monitoring application does not display the display image yet. Therefore, because several copies are acquired, the possibility that the capture application fails to acquire a hard copy of the display image of the prohibited page is reduced. When the hard copies are acquired, the capture application sends the log of the window title including the hard copies to the management server 3 (Operation S38), and the process illustrated in FIG. 6 goes to end.

When a log of the window has been acquired (Yes at Operation S31) or when the window title is not to be acquired as a log (No at Operation S32), the capture application completes the process illustrated in FIG. 6. when no hard copy of the active window is to be acquired (No at Operation S34) or when the set counter is not twice (No at Operation S36), the process control goes to Operation S38 to cause the capture application to send the log of the window title to the management server 3.

During the window-title acquiring process illustrated in FIG. 6, when the title of the active window includes a particular keyword, a hard copy of the active window is acquired. Moreover, during the acquiring process, when a hard copy of the window is acquired, the acquired hard copy is sent to the management server 3 as a log of the window title. The administrator thus automatically acquires a hard copy of a window when the user accesses a window title that includes a particular keyword.

Moreover, in conjunction with the prohibited-page filtering process illustrated in FIG. 4, the capture application sets given words to keywords to prohibited sites and prohibited pages that are included in the prohibited site list 14 and then records the keywords. A recorded keyword is, for example, "user information" and "particular site name". Because, in case of an access to a prohibited page, the title of the display image (window) includes a particular keyword, the capture application acquires a hard copy of the display image (window) of the prohibited page. When a hard copy of the display image (window) of the prohibited page is acquired, the capture application sends the hard copy to the management server 3 as a window title acquisition log. In the same manner as the log information assigned to the window title acquisition log illustrated in FIG. 3 contains, the log information contains the PC name, the access date-and-time, the user name, the domain name, the log type, the reason for collection, the attachment, the details, and the remarks.

The management server 3 acquires, from the log information assigned to the prohibition log acquired during the prohibited-page filtering process illustrated in FIG. 4 and the log information assigned to the window title log acquired during the window-title acquiring process illustrated in FIG. 6, log information assigned to the display image of the same prohibited page. In other words, the management server 3 manages the log information assigned to the window title that contains the hard copy of the display image of the prohibited page and the log information assigned to the prohibition log, by storing data, such as the PC name, the user name, and the domain name, in the log information table 15. Thus, the administrator acquires not only the prohibition log due to the access by the user to the prohibited page but also an evidence for the access by the user to the prohibited page.

When, in the first embodiment, the received URL is a character string of a prohibited page, a display image of the prohibited page of the received URL is displayed in a decreased readability state. Therefore, the user knows that he/she accesses a prohibited page.

Because, in the first embodiment, the transmittance rate of the display image of the prohibited page is adjusted, the user sees the display image being in a semi-transparent state and, therefore, knows that he/she accesses a prohibited page. Because the display image is displayed in a transparent state, the administrator can prevent the user from reading the detail of the prohibited page.

In the first embodiment, when the received URL is a character string of a prohibited page, any actions on the display image of the prohibited page become inactive or invalid. The administrator thus controls actions by a user to a prohibited page.

In the first embodiment, when the received URL is a character string of a prohibited page, any actions of the cursor and the keyboard on the prohibited page become locked, any clicks on a linked page become unacceptable, and any file move actions become unacceptable. The administrator thus controls actions by a user to a prohibited page.

In the first embodiment, when the received URL is a character string of a prohibited page, the display image of the prohibited page is displayed in a transparent state and then the display image is closed. The administrator thus prevents a user from reading a prohibited page.

In the first embodiment, the window-title acquiring process involves acquiring a hard copy of the display image of the prohibited page and then sending the hard copy to the management server 3 as log information assigned to the window title. The management server 3 manages the log information assigned to the window title and the log information assigned to the prohibition log by storing data, such as the PC name, the user name, and the domain name, in the log information table 15. The administrator thus acquires not only the prohibition log due to the access by the user to the prohibited page but also an evidence for the access by the user to the prohibited page.

In the first embodiment, when the received URL is a character string of a prohibited page, a prohibition message is displayed on a screen of the display unit 32. Therefore, the user knows that he/she accesses a prohibited page.

Figure 7:
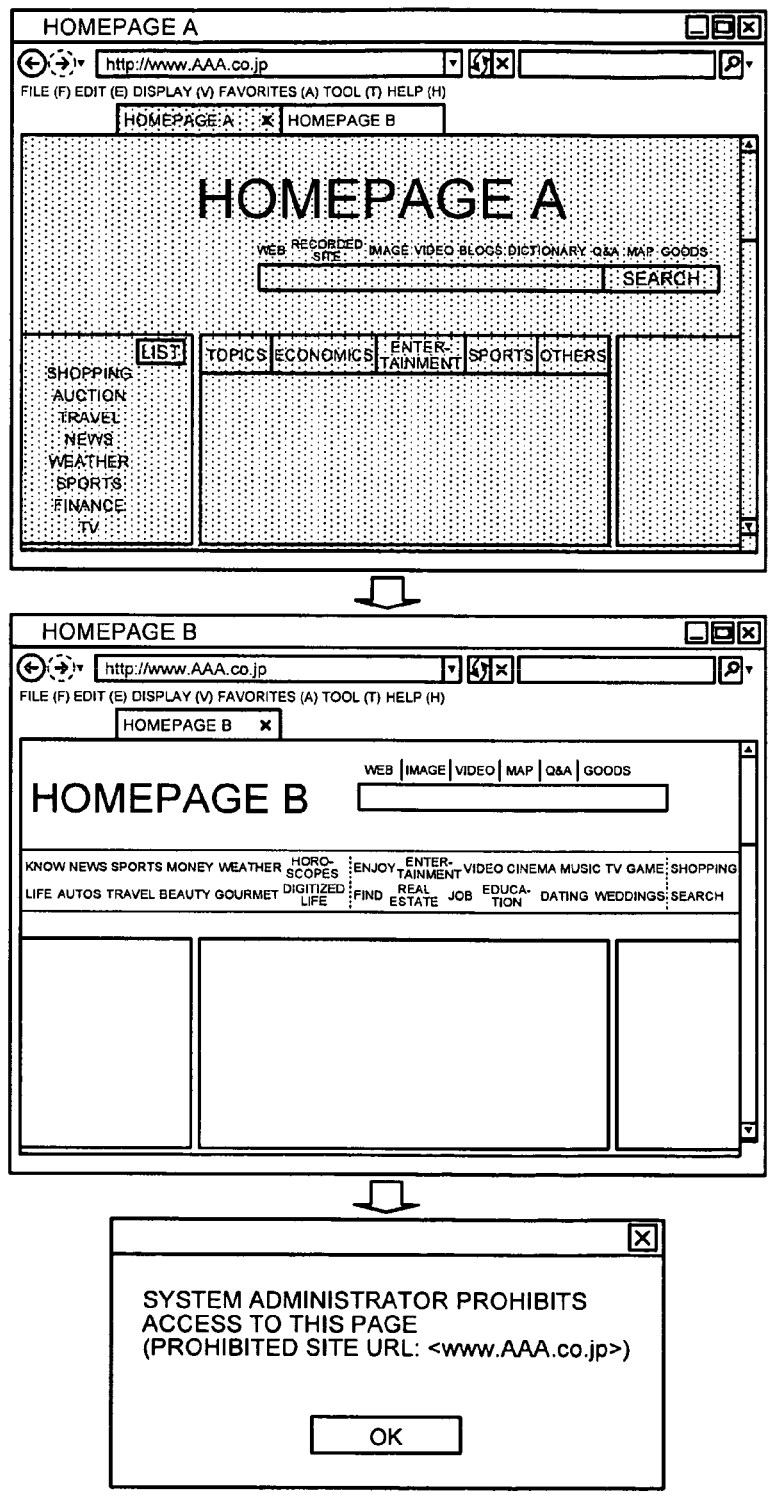
FIG. 7 is a schematic diagram of an example of display images (multi-tabs) sequentially appearing on the client terminal during the prohibited-page filtering process according to the first embodiment.

As illustrated in FIG. 5, in the first embodiment, a single-tab display image of the prohibited page is displayed in a transparent state and then the browser is quit to close the display image. FIG. 7 is a schematic diagram of an example of display images (multi-tabs) sequentially appearing on the client terminal 2 during the prohibited-page filtering process according to the first embodiment.

Because the monitoring application manages display images on the tab basis, only a display image of the prohibited page is displayed in a transparent state. After the display image (homepage A) of the prohibited page is displayed as illustrated in FIG. 7, the monitoring application closes the display image (homepage A) of the prohibited page only. After the display image (homepage A) of the prohibited page is closed, the browser application sets the next tab active and displays the display image (homepage B).

It is allowable to configure the monitoring application to, when the display image (homepage B) is closed and all the tabs are closed, display a prohibition message indicating that an access to the homepage A is prohibited. In other words, when a multi-tab display image is displayed, the tab of the prohibited page is closed and then a display image of a page other than the prohibited page is displayed.

Moreover, it is allowable to configure the monitoring application to, after the browser application sets the next tab active and displays its display image (homepage B), display a prohibition message indicating that an access to the homepage A is prohibited. In other words, when a multi-tab display image is displayed, it is allowable to close the tab of the prohibited page only and then set a display image (homepage B) of a page other than the prohibited page to active and, in the same time, display a message indicating that an access to the homepage A is prohibited.

In the first embodiment, in conjunction with the window-title acquiring process illustrated in FIG. 6, a hard copy of the display image of the prohibited page that corresponds to the received URL is acquired. However, it is allowable to acquire a hard copy of the display image of the prohibited page by using the prohibited-page filtering process alone without usage of the window-title acquiring process illustrated in FIG. 6. An embodiment based on the above concept is described below.

[b] Second Embodiment

Figure 8:
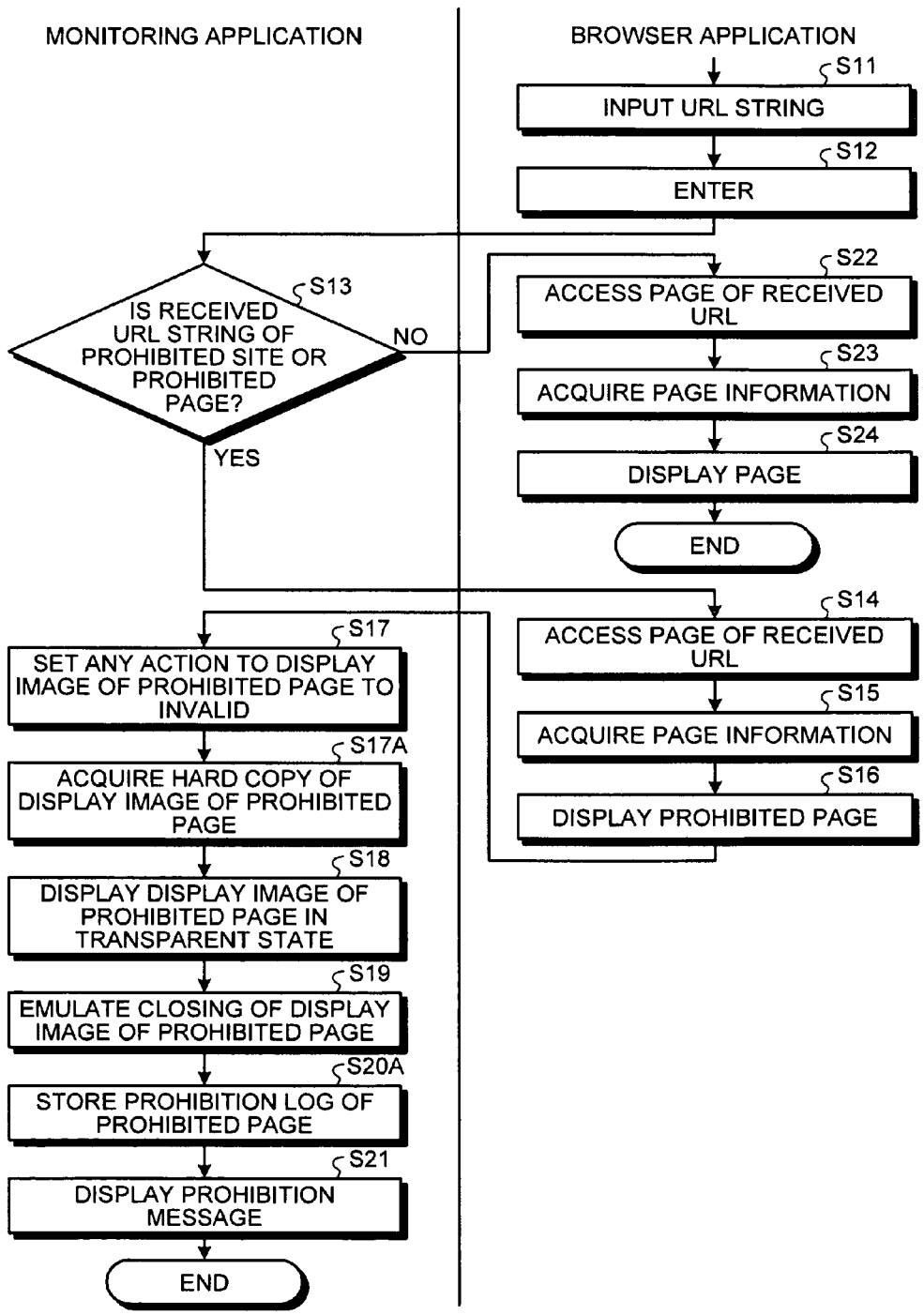
FIG. 8 is a flowchart of a prohibited-page filtering process according to the second embodiment.

FIG. 8 is a flowchart of a prohibited-page filtering process according to the second embodiment. Constituents corresponding to those in the prohibited-page filtering system 1 illustrated in FIG. 1 according to the first embodiment are denoted with the same reference numerals, and the configuration and the operation of the identical constituents are not repeated.

As illustrated in FIG. 8, after any action on the display image of the prohibited page becomes invalid at Operation S17, the monitoring application acquires, by using a hard-copy acquiring unit 47A, a hard copy of the display image of the prohibited page (Operation S17A). The hard-copy acquiring unit 47A performs the above process using the monitoring application. After a hard copy of the display image of the prohibited page is acquired at Operation S17A, the process control goes to Operation S18 and the monitoring application displays the display image in a transparent state.

After the display image is displayed in a transparent state at Operation S18, the monitoring application emulates closing of the display image of the prohibited page at Operation S19 and then closes the display image of the prohibited page. Moreover, the monitoring application records, by using the prohibition-log storage unit 48, the hard copy of the display image of the prohibited page acquired at Operation S17A to a prohibition log of the prohibited page (Operation S20A). The prohibition-log storage unit 48 sends the prohibition log that includes the hard copy of the display image of the prohibited page to the management server 3.

As illustrated in FIG. 8, the prohibited-page filtering process involves acquiring a hard copy of the display image of the prohibited page, including the hard copy in a prohibition log assigned to an access to the prohibited page, and sending the prohibition log to the management server 3. Therefore, by using the prohibited-page filtering process alone without usage of the window-title acquiring process of FIG. 6, a hard copy of the display image of the prohibited page is acquired.

As illustrated in FIG. 8, the prohibited-page filtering process involves displaying the display image of the prohibited page at Operation S16 and then, before displaying the display image in a transparent state, acquiring a hard copy of the display image of the prohibited page at Operation S17A. However, it is allowable to acquire a hard copy of the display image being in a transparent state.

The prohibited-page filtering process according to the second embodiment involves acquiring a hard copy of the display image of the prohibited page, including the hard copy in a prohibition log assigned to an access to the prohibited page, and sending the prohibition log to the management server 3. Therefore, by using the prohibited-page filtering process alone without usage of the window-title acquiring process of FIG. 6, a hard copy of the display image of the prohibited page is acquired.

Although, in the above embodiments, the display image of the prohibited page is displayed in a decreased readability state or in a transparent state, it is allowable to adjust the color (e.g., RGB information) and the luminance of the display image to decrease the readability. When the display image is displayed in a transparent state, it is also allowable to decrease the luminance with the color unchanged and then, for example, include only the color in log information as data and send the log information to the management server 3. In this case, the management server 3 can reproduce the display image of the hard copy by adjusting the luminance with respect to the color included in the log information.

In the above embodiments, the display image of the prohibited page is displayed in a transparent state. It is allowable to display the display image of the prohibited page only for a short time, for example, 500 milliseconds and then close the display image. The user knows that he/she accesses a prohibited page.

In the above embodiments, the control unit 35 includes the receiving unit 41, the executing unit 42, the acquiring unit 43, the determining unit 44, the display control unit 45, the action control unit 46, the hard-copy acquiring unit 47A, and the prohibition-log storage unit 48. However, from the perspective of, when the received URL is a character string of a prohibited page, displaying the display image of the prohibited page in a decreased readability state, the control unit 35 is enough to include the receiving unit 41, the executing unit 42, the acquiring unit 43, the determining unit 44, and the display control unit 45.

The constituent elements of the device illustrated in the drawings need not be physically configured as illustrated. The separated/integrated configuration of the constituent elements is not limited to the configuration illustrated and the constituent elements, as a whole or in part, can be separated or integrated by an arbitrary unit either functionally or physically based on various types of loads or use conditions.

All or some of the processing functions performed by the devices can be executed on a central processing unit (CPU) (or a micro computer, such as, a micro processing unit (MPU) and a micro controller unit (MCU)). All or some of the processing functions can be executed by using a CPU (or a micro computer, such as an MPU and an MCU) on either an analyzing program or wired logic hardware.

Figure 9:
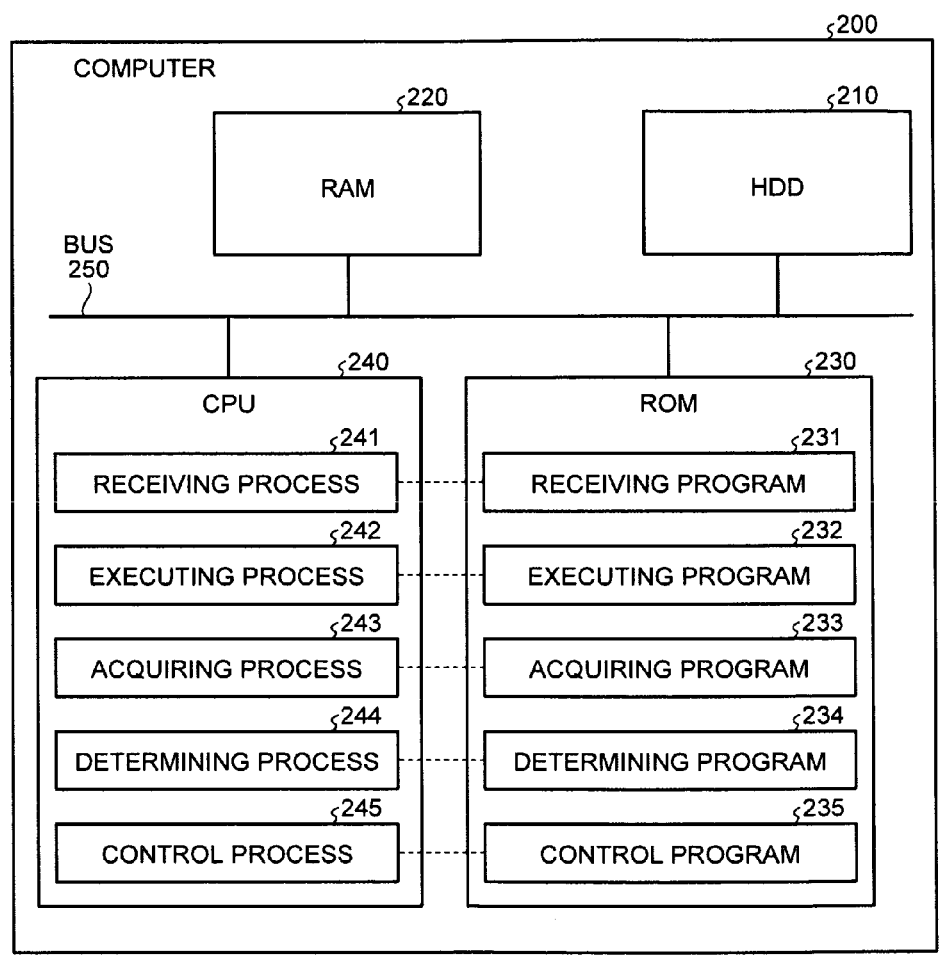
FIG. 9 is a block diagram of a computer that executes an access filtering program.

The various processes described in the above embodiments can be implemented when a computer executes a certain program. In the following, an example of a computer is described with reference to FIG. 9 that executes a program to implement the same functions as those described in the above embodiments. FIG. 9 is a block diagram of a computer that executes an access filtering program.

As illustrated in FIG. 9, a computer 200 that executes the access filtering program includes a hard disk drive (HDD) 210, a random access memory (RAM) 220, a read only memory (ROM) 230, and a CPU 240, the above units being connected to each other via a bus 250.

The ROM 230 stores therein the access filtering program that implements the same functions as those in the above embodiments. As illustrated in FIG. 9, the access filtering program includes a receiving program 231, an executing program 232, an acquiring program 233, a determining program 234, and a control program 235. The programs 231 to 235 can be integrated or separated appropriately in the same manner as the constituent elements of the client terminal 2 illustrated in FIG. 1.

The CPU 240 reads the programs 231 to 235 from the ROM 230 and executes them. As illustrated in FIG. 9, the programs 231 to 235 then operate as a receiving process 241, an executing process 242, an acquiring process 243, a determining process 244, and a control process 245, respectively.

The CPU 240 receives address information indicative of an address of a page posted on a network, excuses, by using the address information, an access to the page, and acquiring, by using the address information, page information. The CPU 240 determines, among access filtering information that is stored in the RAM 220 and that is indicative of an address of a limited access page, whether any access filtering information is present that corresponds to the received address information. When any access filtering information is present that corresponds to the received address information, the CPU 240 displays a display image in a decreased page-readability state. As a result, the user sees the display image appearing in a decreased readability state and knows that he/she accesses a prohibited site or a prohibited page, being prevented from reading the contents of the prohibited site or the prohibited page.

The program disclosed makes a user aware that he/she accesses a limited access site or a limited access page.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it may be understood that the various changes, substitutions, and alterations could be made hereto without departing from the spirit and scope of the invention.

What is claimed is:

1. A non-transitory computer readable storage medium having stored therein a program that causes a computer to execute a process comprising:
   receiving address information indicative of an address of a page posted on a network;
   accessing the page by using the address information;
   acquiring page information by using the address information, the page information including both first information concerned with content of the page and second information concerned with a configuration of a window area of the first information;
   determining whether any access filtering information corresponding to the address information is present in a storage unit to store access filtering information indicative of an address of a limited access page; and
   controlling the window area to set, by using the page information, a transmittance rate of a window area in which contents of a page in the case of determining that the access filtering information is present is displayed higher than a transmittance rate of a window area in which contents of a page in the case of determining that access filtering information is not present is displayed, and to close an active window of the window area after displaying for a predetermined time the window area by using the set transmittance rate.

2. The non-transitory computer readable storage medium according to claim 1,
   wherein the controlling includes controlling, after displaying for the predetermined time the window area of the page detected as a target of filtering, the transmittance rate of the window area of the page detected as the target of filtering.

3. The non-transitory computer readable storage medium according to claim 1,
   wherein the controlling includes increasing gradually or step-by-step, after displaying for the predetermined time the window area of the page detected as a target of filtering, the transmittance rate of the window area of the page detected as the target of filtering.

4. The non-transitory computer readable storage medium according to claim 1,
   wherein the controlling includes making the window area on a background screen to become semi-transparent, after displaying for the predetermined time the window area of the page detected as a target of filtering, by increasing the transmittance rate of the window area of the page detected as the target of filtering so as to decrease the readability of the window area.

5. The non-transitory computer readable storage medium according to claim 1,
   wherein the controlling includes displaying the window area of the page in a decreased readability state by using the first information and the second information, and the displaying includes increasing the transmittance rate of the window area.

6. The non-transitory computer readable storage medium according to claim 5, the program causing the computer to execute the process further comprising:
   creating, when determination is made that any access filtering information corresponding to the address information is present, log information that contains a date and time of the access, the address information, and information indicative of a result of the determining; and
   outputting the log information to an other storage unit to store therein a plurality of pieces of log information that includes the log information.

7. The non-transitory computer readable storage medium according to claim 5, wherein the closing includes closing, regardless of whether an action is received from a user, the window area.

8. The non-transitory computer readable storage medium according to claim 5, the program causing the computer to execute the process further comprising outputting, when a result of the determining is acquired, a warning indicating that the page information assigned to the address information currently being accessed is inaccessible.

9. The non-transitory computer readable storage medium according to claim 5, the program causing the computer to execute the process further comprising setting, when a result of the determining is acquired, to inactive any action performed by a user on the page information assigned to the address information currently being accessed.

10. The non-transitory computer readable storage medium according to claim 6, the program causing the computer to execute the process further comprising acquiring, when a result of the determining is acquired, a snap shot of the window area that is displayed by using the page information, wherein the outputting includes outputting both the acquired snap shot and the log information to the other storage unit.

11. The non-transitory computer readable storage medium according to claim 6, the program causing the computer to execute the process further comprising acquiring, when a title name of the window area includes a keyword of the limited access page, a snap shot of the window area, wherein the outputting includes outputting both the acquired snap shot and the log information to the other storage unit.

12. The non-transitory computer readable storage medium according to claim 5, wherein the displaying includes adjusting color information and luminance information assigned to the window area.

13. The non-transitory computer readable storage medium according to claim 9, wherein the inactive action indicates that any action of a cursor and a keyboard on the page information assigned to the address information currently being accessed is locked.

14. The non-transitory computer readable storage medium according to claim 9, wherein the inactive action indicates that any click on a linked destination on the page information assigned to the address information currently being accessed is unacceptable.

15. The non-transitory computer readable storage medium according to claim 9, wherein the inactive action indicates that any file move action assigned to the page information assigned to the address information currently being accessed is unacceptable.

16. An access filtering method performed by a computer, the method comprising:
- receiving address information indicative of an address of a page posted on a network;
- accessing the page by using the address information;
- acquiring page information by using the address information, the page information including both first information concerned with content of the page and second information concerned with a configuration of a window area of the first information;
- determining whether any access filtering information corresponding to the address information is present in a storage unit to store access filtering information indicative of an address of a limited access page; and
- controlling the window area to set, by using the page information, a transmittance rate of a window area in which contents of a page in the case of determining that the access filtering information is present is displayed higher than a transmittance rate of a window area in which contents of a page in the case of determining that access filtering information is not present is displayed, and to close an active window of the window area after displaying for a predetermined time the window area by using the set transmittance rate.

17. An access filtering device comprising:
- a processor; and
- a memory, wherein the processor executes:
- receiving address information indicative of an address of a page posted on a network;
- accessing the page by using the address information;
- acquiring page information by using the address information, the page information including both first information concerned with content of the page and second information concerned with a configuration of a window area of the first information;
- determining whether any access filtering information corresponding to the address information is present in a storage unit to store access filtering information indicative of an address of a limited access page; and
- controlling the window area to set, by using the page information, a transmittance rate of a window area in which contents of a page in the case of determining that the access filtering information is present is displayed higher than a transmittance rate of a window area in which contents of a page in the case of determining that access filtering information is not present is displayed, and to close an active window of the window area after displaying for a predetermined time the window area by using the set transmittance rate.

* * * * *